US006636592B2

United States Patent
Marchand et al.

(10) Patent No.: US 6,636,592 B2
(45) Date of Patent: Oct. 21, 2003

(54) METHOD AND SYSTEM FOR USING BAD BILLED NUMBER RECORDS TO PREVENT FRAUD IN A TELECOMMUNICATION SYSTEM

(76) Inventors: Dean C. Marchand, 10484 Foxfire St., Longmont, CO (US) 80504; Arthur Lance Springer, 129 Gilbertville Rd., Waterloo, IA (US) 50707

( * ) Notice: Subject to any disclaimer, the term of this patent is extended or adjusted under 35 U.S.C. 154(b) by 0 days.

(21) Appl. No.: 09/964,419

(22) Filed: Sep. 28, 2001

(65) Prior Publication Data

US 2003/0063725 A1 Apr. 3, 2003

(51) Int. Cl.⁷ .............................................. H04M 15/00
(52) U.S. Cl. ............................ 379/114.14; 379/127.02; 379/114.01; 379/114.03; 379/114.15; 379/126; 379/133; 379/188
(58) Field of Search ..................... 379/32.01, 112.01, 379/114.01, 114.03, 114.14, 115.01, 126, 127.02, 133, 188, 189, 196, 197, 198, 210.02, 220.01, 221.02, 221.03, 221.14, 222, 32.03, 32.04, 32.05, 114.04, 114.15, 114.19, 114.28, 130, 134, 137, 139

(56) References Cited

U.S. PATENT DOCUMENTS

| | | | | |
|---|---|---|---|---|
| 5,495,521 A | * | 2/1996 | Rangachar | 379/93.04 |
| 5,638,430 A | * | 6/1997 | Hogan et al. | 379/114.14 |
| 5,768,354 A | * | 6/1998 | Lange et al. | 379/189 |
| 5,875,236 A | * | 2/1999 | Jankowitz et al. | 379/114.24 |
| 5,907,602 A | * | 5/1999 | Peel et al. | 379/114.14 |
| 6,163,604 A | * | 12/2000 | Baulier et al. | 379/189 |
| 6,189,031 B1 | * | 2/2001 | Badger et al. | 709/224 |
| 6,208,720 B1 | * | 3/2001 | Curtis et al. | 379/114.14 |
| 6,418,212 B1 | * | 7/2002 | Harrison et al. | 379/189 |

* cited by examiner

Primary Examiner—Binh Tieu
Assistant Examiner—Quoc D Tran

(57) ABSTRACT

A method for using at least one Bad Billed Number Record (BBN) to detect fraud in a telecommunication system includes the steps of generating the at least one BBN for each call attempt made using a billing product, when the call attempt satisfies any one of a plurality of fraud criteria; storing the at least one BBN in a storage queue for later retrieval; and retrieving and analyzing the at least one BBN to increment a plurality of fraud control counters according to the analysis. A system for using a plurality of BBNs to detect fraud in a telecommunications system includes a network operator service platform (OSP) for generating BBNs based on received call attempts; a network information concentrator (NIC) for temporarily storing the generated BBNs; and a fraud monitoring system for retrieving the stored BBNs, filtering out unidentifiable BBNs, analyzing identifiable BBNs, and generating alarms based on the analysis.

16 Claims, 3 Drawing Sheets

METHOD AND SYSTEM FOR USING BAD BILLED NUMBER RECORDS TO PREVENT FRAUD IN A TELECOMMUNICATION SYSTEM

FIELD OF THE INVENTION

The present invention relates to preventing fraudulent access to a telecommunications system. In particular, the invention relates to a method and system for using bad billed records generated during failed call attempts prevent fraudulent access to a telecommunications system.

DESCRIPTION OF THE RELATED ART

Fraud costs the telecommunications industry billions of dollars per year. There are many techniques used to perpetrate fraud. The fraud can be as simple as using a stolen credit card or calling card to charge a long distance call, or it can involve sophisticated looping techniques, such as repeatedly calling a private PBX system, finding the correct sequence to access an outside line (by trial and error or other hacking techniques) and then placing a costly long distance call through the PBX system. The telecommunications industry is involved in an intensive and ongoing effort to identify different types of fraud and then to develop and implement ways of preventing such fraud.

Fraud is more costly to certain telecommunications companies than others. For example, where a fraudulent call is directed at a company that owns the underlying telecommunications infrastructure, the cost of the call is less than the cost to an independent company that incurs access charges to the owner(s) of the infrastructure supporting the call, even if the call is fraudulent. In either case, however, the cost to the industry is significant.

Particular methods of fraud control and systems for implementing them are known in the industry. Fraud control may be divided conceptually into identifying a call that is likely to be fraudulent and responding after a call is identified as likely to be fraudulent.

Methods of identifying calls that are likely to be fraudulent vary from the simple to the sophisticated and are generally directed at a particular type of fraudulent activity. For example, a call is likely to be fraudulent if it is made using a calling card that has been reported stolen by the owner. A more sophisticated method and system of identifying fraudulent calls is described in U.S. Pat. No. 5,768,354, entitled "Fraud Evaluation And Reporting System and Method Thereof", which is owned by the assignee of the present invention. Fraudulent activity is identified in the '354 patent by monitoring a billing detail record created for each call. In the simple case where the company's database shows that the billing number being used for a call has been reported lost, stolen, etc., the billing detail record includes a header designating it is a "bad billing number", the call is immediately identified fraudulent and an alert is generated in the system.

The '354 patent is directed at calls that require "special service", that is, which are placed through an operator or an automatic operation support system. Such calls generally require the caller to manually supply the billing number, such as by pressing numbers on a payphone, swiping the magnetic strip on a card or speaking with an operator. It may also require the caller to identify the category of billing product (such as credit card, calling card, pre-paid phone card) for the billing number. The category of the billing product may alternatively be identified by the system by matching all or part of the billing number with billing numbers (or ranges of billing numbers) stored in an identification database, where the stored billing numbers are correlated with the category of billing product. The identification database may also correlate a billing number with the particular type of billing product for the category. For example, where the category of the billing number is identified as a credit card, the identification database may use the billing number to further identify the type of credit card, such as Visa, Master Card, American Express, etc.

The '354 patent also identifies fraudulent activity by monitoring use of a billing number over time. For example, where the number of domestic calls placed within a certain amount of time using the same billing number exceeds a threshold, an alert is generated. International calls are similarly handled, however, the threshold may be adjusted so that fewer calls within the time period generate an alert. In addition, the threshold may be further adjusted for calls to countries where a high percentage of fraudulent calls are directed. The thresholds may also be varied by the billing product. For example, fraudulent activity may be determined to be more likely to occur on a calling card than on a third party call; consequently, the threshold may be set lower for calling card products.

Once a call generates an alert that the call might be fraudulent, additional activity may be taken to further examine whether the billing number is being used fraudulently, or steps may be taken to prevent further calls using the billing number. In the '354 patent, after an alarm is generated, data for prior calls charged to the billing number are sent to a fraud analyst, who analyzes that data and may determine whether or not to deactivate the card. If the decision is to deactivate the card, the '354 patent describes the analyst as setting a fraud flag. Setting of the fraud flag causes subsequent calls using this billing number to be intercepted or blocked.

Various records have been used in telecommunications management and fraud control. For example, when a call is completed, a Call Detail Record (CDR) may be created which is associated with that call. The CDRs are generated within the telecommunications network and collected by a billing software program. The billing software program then selects suspect CDRs and forwards them to a fraud control system. The fraud control system processes the suspect CDRs by reviewing the information and comparing the information with established thresholds, and generates an alarm when the thresholds are exceeded.

A problem with prior art fraud detection systems is that they generally require a fraudulent call to be successful prior to generating a CDR. This introduces an inherent limitation into the fraud prevention process, in that the service must be stolen prior to any fraud detection occurring. This gives phone hackers an advantage of staying a step ahead of detection.

Sophisticated phone hackers may further take advantage of this limitation by attempting calls using an invalid or blocked calling card number via an automatic operator console or manual operator console. The caller is then prompted to re-enter the calling card number, and is free to do so without any record being generated. This procedure may be repeated up to three times before any record of the attempts is generated. With this knowledge, a sophisticated phone hacker can hang up after two attempts and call back again, repeatedly restarting the process without any fraud control records being generated.

SUMMARY OF THE INVENTION

The present invention provides for a new record type called a bad billed number record (BBN) to be generated on each call attempt whenever a calling card number is blocked, the terminating number is blocked, or the calling card number is invalid. The BBN preferably includes the operator site number, representing the operator site the call was processed through; the access method, representing the access method the call used to reach the operator platform; the billed number used to make the call; the originating number of the call; the information digit, used to determine the identity type of the originating number (i.e. payphone, home phone, mobile phone, PBX, etc.); the bill type, representing the product type of the billed number (i.e. calling card, credit card, etc.); the call type, representing the access feature of how the billed number is processed; and the termination method, representing how the call terminated within the network.

It is an object of the present invention to provide a method and system for detecting fraudulent use of card numbers, such as calling cards or credit cards.

It is another object of the present invention to provide a method and system for generating BBNs to improve detection of fraudulent use of card numbers.

It is still another object of the present invention to provide a method and system for generating BBNs upon receipt of a first bad billed number at an automatic operator console or manual operator console.

To achieve the above objects, a method for using at least one BBN to detect fraud in a telecommunication system includes the steps of: generating the at least one BBN for each call attempt made using a billing product, when the call attempt satisfies any one of a plurality of fraud criteria; storing the at least one BBN in a storage queue for later retrieval; and retrieving and analyzing the at least one BBN to increment a plurality of fraud control counters according to the analysis.

A system for using a plurality of BBNs to detect fraud in a telecommunications system includes a network operator service platform (OSP) for receiving call attempts using a billing product and generating BBNs based on the received call attempts; a network information concentrator (NIC) for temporarily storing the generated BBNs; and a fraud monitoring system for retrieving the stored BBNs, filtering out unidentifiable BBNs, analyzing identifiable BBNs, and generating alarms based on the analysis.

BRIEF DESCRIPTION OF THE DRAWINGS

The above and other objects, features, and advantages of the present invention will become more apparent in light of the following detailed description of an exemplary embodiment thereof taken in conjunction with the attached drawings in which.

DETAILED DESCRIPTION OF THE PREFERRED EMBODIMENTS

Figure 1:
FIGS. 1 and 1A are block diagrams of a telephone system that includes an intelligent services network (ISN)

Referring now to the drawings, in which like reference numerals identify similar or identical elements, and in particular to FIG. 1, a representation of a telephone system that includes an intelligent services network (ISN) is shown.

A call from an originating telephone 10 (also referred to as an originating automatic number identification or originating ANI) is connected to an ISN 40 through a first competitive local exchange carrier 20 (CLEC), such as MCI, and a first bridge switch (B/S) 30. After processing, the ISN 40 routes the call to terminating telephone 70 (also referred to as an terminating automatic number identification or terminating ANI) via a second B/S 50 and a second CLEC 60.

Figure 1A:
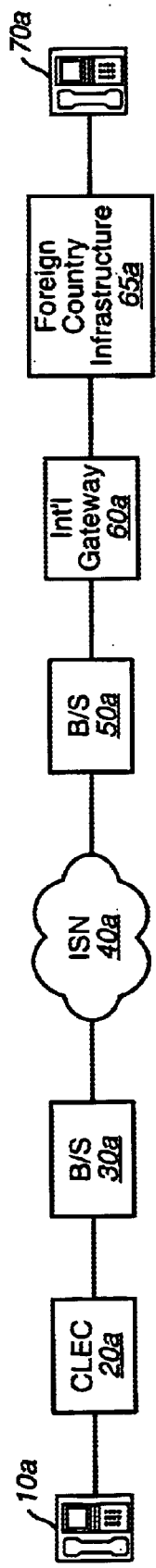

Depending on where the call originates and terminates, additional or alternative infrastructure may support the connection between the originating ANI and the ISN and/or between the terminating ANI and the ISN. For example, as shown in FIG. 1A, if the call is made to a terminating ANI 70A in a foreign country, the call is routed from the ISN 40A to the terminating ANI 70A through B/S 50A, international gateway connection 60A and the local switching of the foreign country infrastructure 65A. The foreign country infrastructure 65A can be comprised of a number of regional and local carriers.

The supporting connections for a call that is placed using the ISN platform are billed to a company that owns and/or operates the ISN (referred to as the "telecommunications company". Thus, referring back to FIG. 1, the connection charges of CLEC 20, B/S 30, B/S 50 and CLEC 60 are the responsibility of the telecommunications company. Similarly, the telecommunications company is responsible for the connection charges shown in FIG. 1A, including the international gateway connection 60A and the connections made in the foreign country via the foreign country infrastructure 65A. The telecommunications company, of course, passes these costs along to its customer, typically the caller at the originating ANI.

For example, where the caller uses a calling card at an originating ANI that is a pay phone, the call is billed to the card account number by the telecommunications company. However, if the call has been placed fraudulently, the telecommunications company still must pay the supporting connection charges for the call, but cannot bill a customer for the call. This is the principle cost of fraud to the telecommunications company: having to pay connection charges to other companies that support the fraudulent call. While there is also a loss to the telecommunications company for use of the ISN, the cost of internal use is small in comparison with telecommunications company's responsibility for third party connection charges.

Figure 2:
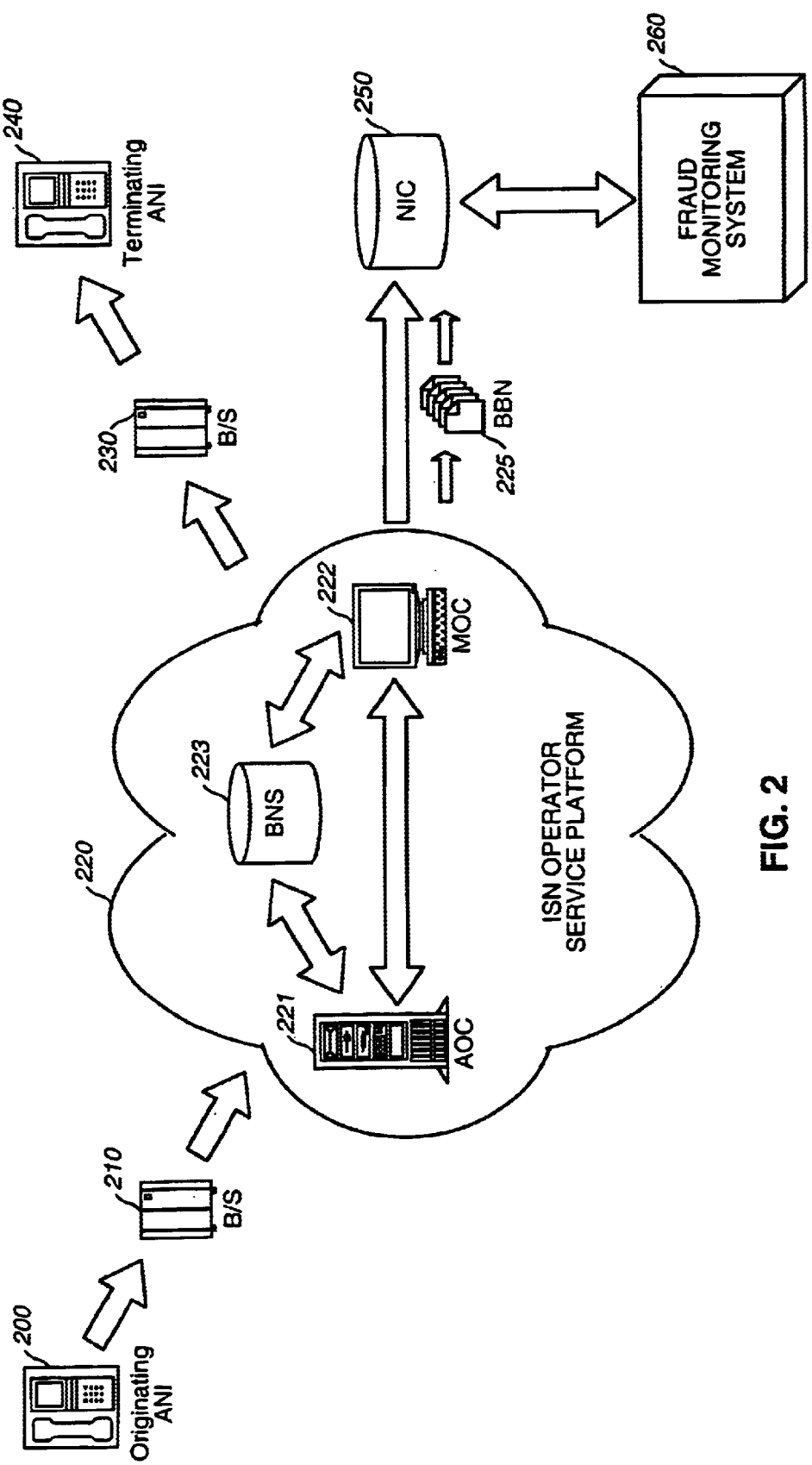
FIG. 2 is a block diagram illustrating a system for detecting fraudulent use of card numbers in accordance with the present invention.

Referring now to FIG. 2, a system for detecting fraudulent use of calling card numbers in accordance with the present invention is illustrated. When a calling card call is placed from an originating ANI 200 to a terminating ANI 240, the call is routed to an ISN Operator Service Platform 220 (OSP) for call handling via a first B/S 210. A successful call may be completed to the terminating ANI 240 via a second B/S 230 via normal call processing. Here, a first and second CLEC and other infrastructure are omitted for clarity.

A BBN 225 is generated whenever a calling card number is blocked, the terminating number is blocked, or the calling card number is invalid. The BBN 225 preferably includes the operator site number, representing the operator site the call was processed through; the access method, representing the access method the call used to reach the operator platform; the billed number used to make the call; the originating number of the call; the information digit, used to determine the identity type of the originating number (i.e. payphone, home phone, mobile phone, PBX, etc.); the terminating number of the call; the bill type, representing the product type of the billed number (i.e. calling card, credit card, etc.); the call type, representing the access feature of how the billed number is processed; and the termination method, representing how the call was terminated within the network. A Billed Number Screening Database (BNS) 223 is accessed to determine if the calling card number is blocked, the calling card is invalid or the terminating number is blocked.

The BBN 225 may be created at the Automatic Operator Console (AOC) 221 or the Manual Operator Console (MOC) 222 within the ISN OSP 220 and is forwarded to a Network Information Concentrator (NIC) 250 for storage. The NIC 250 is a call record database. The NIC 250 is accessed by a Fraud Monitoring System (FMS) 260. The FMS 260 evaluates the BBNs and generates alarms when thresholds for attempts to the terminating number, from the originating number, and using the billed number are exceeded. A threshold is a number which, when exceeded, generates an alarm indicating possible fraud. For example, the number of call attempts may have a threshold of 100 over a given period of time. If, within that period of time, a $101^{st}$ attempt is made, a threshold alert would be generated. Thresholds may be specified for different times, different days of the week, different billing categories, different geographical regions etc., and are evaluated according to a rules based algorithm.

Within the FMS 260 there are filters to filter out BBNs 225 which cannot be properly identified. For example, one such filter may look for BBNs 225 wherein the terminating numbers are less than 6 digits in length. Such BBNs 225 would only serve to add unidentifiable records to the fraud detection process. Similarly, BBNs 225 wherein the billed numbers are less than 8 digits in length are also filtered out.

Figure 3:
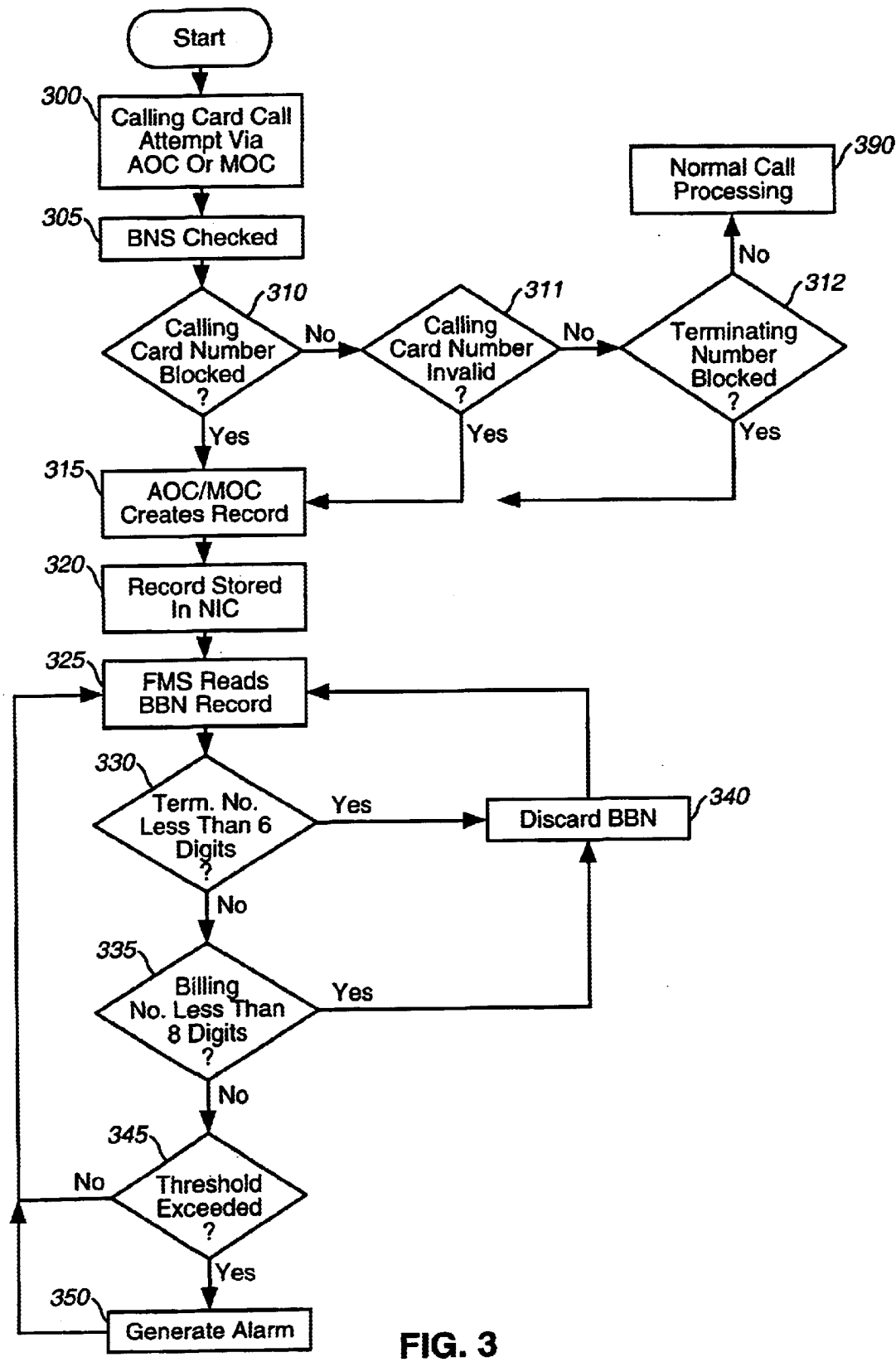
FIG. 3 is a flow chart illustrating a method for detecting fraudulent use of card numbers in accordance with the present invention.

FIG. 3 is a flow chart illustrating a method for detecting fraudulent use of calling card numbers in accordance with the present invention. An attempted call is made from an originating ANI 200 through a B/S 210 to the ISN OSP 220 which is handled by the AOC 221 or MOC 222 in step 300. The call information is checked by the AOC 221 or MOC 222 by accessing the BNS 223 to validate the calling card number in step 305. More particularly, the BNS 223 is accessed to determine if the calling card number is blocked in step 310, if the calling card number is invalid in step 311 or if the terminating number is blocked in step 312. If any one of these three criteria are met, the AOC 221 or MOC 222 creates a BBN 225 in step 315. The BBN 225 is then stored in the NIC 250 in step 320 for retrieval by the FMS 260. However, if none of the aforementioned criteria are met, the call is processed normally in step 390.

The FMS 260 retrieves and evaluates each BBN 225 in steps 325 to 350. More specifically, a BBN 225 is read by the FMS 260 in step 325, filters are applied in steps 330–340, comparisons are made to thresholds in step 345, and alarms are generated in step 350. In steps 330 and 335, it is determined, for example, whether the terminating number is less than 6 digits in length and whether the billing number is less than 8 digits in length, respectively. If either condition is met, the respective BBN 225 is filtered out and discarded in step 340 to remove unidentifiable records which only add additional traffic to the statistical analysis performed within the FMS 260, and the next BBN 225 is retrieved. However, if neither condition is met, the BBN 225 is further analyzed by the FMS 260 and the data therein is extracted for updating various counters relating to established thresholds, and it is determined whether any thresholds have been exceeded in step 345. Here, thresholds for attempts to the terminating number, attempts from the originating number, and attempts using the billed number are primarily evaluated, however other thresholds may also be evaluated. If it is determined that a threshold has been exceeded in step 345, an alarm is generated by the FMS 260 in step 350. These alarms are gathered into alarm reports and made available for evaluation by a fraud analyst. The fraud analyst typically monitors and retrieves the reports using a fraud control work station which gathers the reports from the FMS 260.

Therefore, as can be appreciated, the present invention provides improved fraud detection techniques by providing records for failed call attempts. This data may be analyzed and is added to the ever growing arsenal of weapons required by telecommunication companies in their battle against phone fraud.

Although the present invention has been described using an exemplary embodiment in connection with fraudulent calling card use, it is equally applicable to other billing methods (billing products) and should not be limited in this respect. For example, the present invention may be applied to fraudulent credit card use, using similar techniques, and appropriate thresholds and filtering criteria.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A method for detecting fraud in a telecommunication system, the method comprising:

determining whether a call attempt stemming from a billing product fails based upon a fraud criterion including at least one of determining whether a number for the billing product is blocked, determining whether the number for the billing product is invalid, and determining whether a call terminating number of the call attempt is blocked;

generating a bad billed number record for the call attempt if the call attempt failed based on the fraud criterion; and analyzing the generated record if the generated record does not satisfy the filtering criterion that includes at least one of determining whether a call terminating number of the call attempt is less than six digits in length and determining whether a call billing number of the call attempt is less than eight digits in length.

2. The method according to claim 1, wherein the billing product is a calling card.

3. The method according to claim 1, wherein the billing product is a credit card.

4. The method according to claim 1, further comprising: deleting the record if the filter criterion is satisfied.

5. The method according to claim 1, further comprising:

setting a predetermined threshold for a counter corresponding to the generated record; and determining whether the predetermined threshold has been exceeded within a predetermined period of time based on the counter.

6. The method according to claim 5, further comprising:

generating an alarm if the predetermined threshold is exceeded within the predetermined time period.

7. The method according to claim 6, wherein the alarm is forwarded to a fraud control terminal to notify a fraud analyst accessing the fraud control terminal, thereby allowing the fraud analyst to take fraud control preventive measures.

8. The method according to claim 7, wherein the fraud control preventive measures include one of blocking a billing product number, blocking a call terminating number and blocking a call originating number.

9. The method according to claim 5, wherein the counter tracks one of a number of call attempts to a call terminating number, a number of call attempts from a call originating number, and a number of call attempts using the number for the billing product.

10. A method for detecting and preventing fraud in a telecommunication system, said method comprising the steps of:

determining whether a call to a number associated with a billing product is blocked or invalid, or whether a call terminating number corresponding to the call is blocked;

generating a record for the call if the number associated with the billing product is invalid or blocked, or the call terminating number corresponding to the call is blocked;

deleting the record if the call terminating number is less than six digits in length or if the number associated with the billing product is less than eight digits in length;

incrementing a plurality of fraud counters, for each corresponding record which is not deleted based on a number of records corresponding to the call terminating number, a number of records corresponding to a call originating number, and a number of records corresponding to the call billing product number;

setting a corresponding predetermined threshold for each one of the plurality of fraud counters;

monitoring each one of the plurality of fraud counters to determine if the corresponding predetermined threshold has been exceeded within a predetermined period of time;

generating an alarm when the corresponding threshold is exceeded within the predetermined time period; and forwarding the alarm to a fraud control terminal to notify a fraud analyst accessing the fraud control terminal, thereby allowing the fraud analyst to analyze the alarm and take fraud control preventive measures according to the analysis.

11. A system for detecting fraud in a telecommunications system, comprising:

a network operator service platform (OSP) for receiving call attempts using a billing product and generating a record based on each received call attempt if the call attempt fails based upon a fraud criterion including at least one of determining whether a number for the billing product is blocked, determining whether the number for the billing product is invalid, and determining whether a call terminating number of the call attempt is blocked;

a network information concentrator (NIC) for temporarily storing the generated records; and a fraud monitoring system for retrieving the stored records, filtering out unidentifiable records, analyzing identifiable records, and generating an alarm based on the analysis.

12. The system of claim 11, wherein the OSP comprises:

an automatic operator console (AOC);

a manual operator console (MOC); and a billed number screening database (BNS), wherein the call attempt is routed to either the AOC or the MOC, either of which accesses the BNS to determine whether a number for the billing product is blocked, whether the number for the billing product is invalid, or whether a call terminating number is blocked, and to generate the record if the number for the billing product is blocked or invalid, or whether the call terminating number is blocked.

13. The system of claim 11, wherein the identifiable records are analyzed by the fraud monitoring system to increment a plurality fraud counters corresponding to a number of call attempts to a call terminating number, a number of call attempts from a call originating number, and a number of call attempts using a billing product number.

14. The system of claim 13, wherein the alarms are generated when any one of the plurality of fraud counters exceeds a predetermined threshold value within a predetermined period of time.

15. The method according to claim 14, wherein the alarms are forwarded to a fraud control terminal to notify a fraud analyst accessing the fraud control terminal, thereby allowing the fraud analyst to take fraud control preventive measures.

16. A method for detecting fraudulent use of a billing product, the method comprising:

tracking a number of failed call attempts using the billing product having a corresponding number and a corresponding terminating call number;

retrieving a bad billed number record associated with the billing product, wherein the bad billed number record is generated if the call attempts fail, wherein failure occurs if the billing product number is blocked or invalid or the terminating call number is blocked;

analyzing the bad billed number record to generate an alarm if the number of failed call attempts to the billing product exceeds a predetermined threshold;

determining whether the bad billed number record is unidentifiable; and discarding the bad billed number record if the bad billed number record is unidentifiable.

* * * * *